United States Patent [19]

Getgen

[11] 3,886,316

[45] May 27, 1975

[54] ELECTRIC RESONANT TRANSFER FILTER

[75] Inventor: Lawrence E. Getgen, Redwood City, Calif.

[73] Assignee: GTE Automatic Electric Laboratories Incorporated, Northlake, Ill.

[22] Filed: Mar. 2, 1973

[21] Appl. No.: 337,616

[52] U.S. Cl. .............................. 179/15 AA; 333/70

[51] Int. Cl. .............................................. H04j 3/00

[58] Field of Search ............ 179/15 AA; 333/70, 20; 328/67; 235/152

[56] References Cited

UNITED STATES PATENTS

| | | | |
|---|---|---|---|
| 3,303,438 | 2/1967 | Fettweis | 333/70 R |
| 3,431,360 | 3/1972 | Fettweis | 333/70 R |
| 3,641,271 | 2/1972 | Fettweis | 179/15 AA |

OTHER PUBLICATIONS

Bandpass Filter Shapes Up From a Low Pass Network, by Geffe, Electronics, July 6, 1970.

A Network Containing A Periodically Operated Switch Solved by Successive Approximations, by Desoer, Bell System Technical Journal, Nov. 1957.

*Primary Examiner*—Kathleen H. Claffy
*Assistant Examiner*—Thomas D'Amico
*Attorney, Agent, or Firm*—Leonard R. Cool; Douglas M. Gilbert; T. C. Jay, Jr.

[57] ABSTRACT

A resonant transfer filter is disclosed for use in a resonant transfer system having a normally open gate which is closed at a sampling frequency for the transfer of energy. The filter incorporates inductance elements and capacitance elements having values determined directly from the transmission function for filters in the resonant transfer mode developed by Cattermole and having a passband width of less than one-half of the sampling frequency. The filter element values are determined by first choosing a prototype filter configuration which approximates the system attenuation requirements and which is suitable for resonant transfer applications. The prototype element values are used as starting values which are revised or altered to decrease the difference between the Cattermole transmission function when computed using the starting element values, and later the altered values, and the ideal transmission function, equaling unity over the passband and zero in the stopband.

4 Claims, 5 Drawing Figures

ELECTRIC RESONANT TRANSFER FILTER

BACKGROUND OF THE INVENTION

The invention relates to resonant transfer systems, i.e., the transmission of energy between energy storage devices connected in a series resonant circuit having a normally open gate which is periodically closed at a sampling frequency to effect resonant energy transfer on each gate closing. More specifically, the invention relates to the design of a filter serving as an energy storage device and designed to provide system attenuation requirements, see:

1. Cattermole, K., "Efficiency and Reciprocity in Pulse-Amlitude Modulation." Proceedings of the Institute of Electrical Engineers, 105B: 449–462, September 1958.
2. Roehr, K.; Thrasher, P.; and McAuliffe, D.; "Filter Performance in Integrated Switching and Multiplexing." IBM Journal 9:282–291. July 1965.
3. Fettweis, A., Network and Switching Theory, Chapter 4. "Theory of Resonant Transfer Circuits," Academic Press, New York, 1968.
4. Gibbs, A., "Design of a Resonant Transfer Filter." IEEE Trans. on Circuit Theory CT-13: 392–398, Dec. 1966.
5. May, P. and Stump, T., "Synthesis of a Resonant Transfer Filter as Applied to a Time-Division Multiplex System." AIEE Trans., Part 1, Communication and Electronics, 79: 615–620, November 1960.
6. Thomas, G., "Synthesis of Input and Output Networks for a Resonant Transfer Gate." 1961, Institute of Radio Engineers, International Convention Record, 4:236–243.
7. Fettweis U.S. Pat. No. 3,303,438.
8. Fettweis U.S. Pat. No. 3,431,360.

Resonant filters found in the prior art, with the exception of Fettweis, supra, require that the filter impulse response at the gated port be zero at the sampling intervals. A corollary of this criterion is that the filter may have only a 3 dB loss at one-half of the sampling frequency, see Bennett & Davy, Data Transmission, McGraw-Hill 1965, p. 54, and Gibbs, supra. Inherent in sampling systems of the present character is the creation of lower and upper sidebands at the sampling frequency and at multiples of the sampling frequency. Accordingly, the lower sideband at one sampling frequency multiple will overlap the upper sideband of the next lower frequency multiple unless the attenuation of the signal at the sideband cut-off is sufficient to prevent such overlap. This phenomenon is known as aliasing or foldover distortion.

For many applications the above-noted 3 dB attenuation is simply not enough to provide satisfactory transmission, i.e., with an acceptable distortion level. On the contrary, for many applications an attenuation of 50 to 70 dB is necessary.

A low-pass filter may be readily designed to provide a signal attenuation of 25 dB or more, at one-half the sampling frequency, depending on the complexity of the filter. The signal attenuation and, thus filter complexity is determined by the requirements of the communication system. Pairing such a filter with a similarly designed low-pass or band-pass filter will provide the required signal attenuation between adjacent sidebands.

Fettweis, supra, discloses a method of construction of filters for resonant transfer which does not require the impulse response zero crossings to occur at multiples of the sampling frequency. However, to accomplish this, Fettweis is required to use a compensating network in order to eliminate the imaginary component of the transmission function, see U.S. Pat. No. 3,303,438. The quality of a filter is determined by the number of its components. A compensating network requires additional components without improving quality, thus significantly adding to the expense of the system without improvement with respect to the passband. A further objection to the use of a compensating network is that it unduly constrains the physical configuration of the filter.

An object of the present invention is to provide a filter design for use in resonant transfer systems and which is not dependent upon either the criteria of impulse response zeros at multiples of the sampling frequency, or in the use of a compensating network.

Another object of the present invention is to provide a method for readily determining component values of a resonant filter so as to approximate system attenuation requirements, e.g., a transmission function approaching unity over the passband and an attenuation much greater than the conventional 3 dB loss for frequencies above the highest frequency of interest, particulary at and above one-half the sampling frequency.

The invention possesses other objects and features of advantage, some of which will be set forth in the following description of the preferred form of the invention, which is illustrated in the drawings accompanying and forming part of this specification. It is to be understood, however, that variations in the showing made in the drawings and description may be adopted within the scope of the invention as set forth in the claims.

Figure 1:
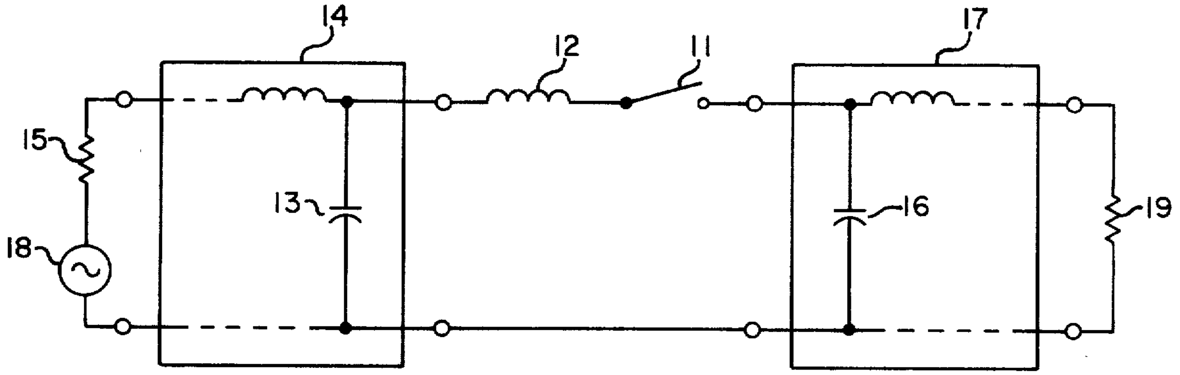
FIG. 1 is a circuit diagram of filters connected in a typical resonant transfer system.

A typical filter arrangement for resonant transfer of energy between filters 14 and 17 is illustrated in FIG. 1. Filter 14 terminates in a capacitor 13 which is connected in series with inductor 12, gate 11, and capacitor 16 of filter 17 for resonant transfer of energy between capacitors 13 and 16 upon periodic closing of gate 11. Gate 11 is closed at a sampling frequency of at least two times the highest message frequency of interest in accordance with the well-known Nyquist sampling theorem.

As shown in FIG. 1, filter 17 will be normally terminated in a load impedance 19 which may be a transmission line or other component, and the input terminals of filter 14 will be connected to an incoming line having a signal source 18 and input impedance 15. Filters 14 and 17 may comprise a plurality of inductance and capacitance elements connected in various filter configurations so long as they are compatible with the resonant transfer mode of operation.

Figure 5:
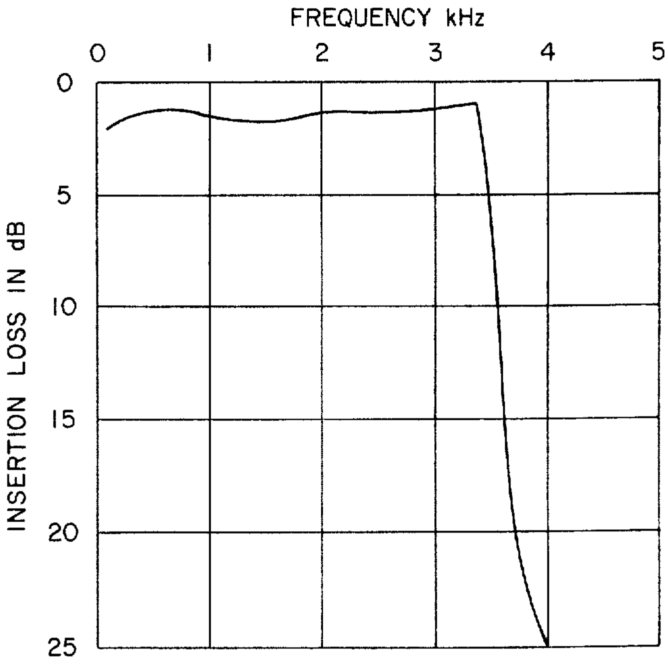
FIG. 5 is the actual measured insertion loss of back-to-back filters of the configuration of FIG. 2 and with optimized components according to the present invention and when connected as in FIG. 1.

For purposes of illustrating the present invention, the first step in the filter design is to select a prototype filter configuration suitable for resonant transfer application and having element values providing a passband width less than one-half of the sampling frequency and designed to approximate the system attenuation requirements such as generally illustrated in FIG. 5. This prototype design may be selected from a handbook or from the designer's personal knowledge and experience. In the present instance, the filter configuration illustrated in FIG. 2 has been selected as illustrated for use as filter 14 or 17 of the resonant transfer system as shown in FIG. 1. This filter has an input inductor $L_1$; capacitor $C_1$ connected between inductor $L_1$ and parallel filter section 33 comprising inductor $L_2$ and capacitor $C_2$; capacitor $C_4$ connected between filter section 33 and a second parallel filter section 34 composed of inductor $L_3$ and capacitor $C_3$; and capacitor $C_5$ connected across the switched port 36 of the filter, capacitor $C_5$ here corresponding with capacitor 13 or capacitor 16 in FIG. 1. All that is necessary as a first step in practicing the present invention is to select a filter configuration and the reasonable component values for initiating the minimization procedure to follow. No undue amount of time is required in choosing the prototype configuration and initial component values.

The present invention consists briefy in the determination of the filter component values, $L_1 - L_3$ and $C_1 - C_5$, by the formula:

$$|T(j\omega)| = \frac{2}{T_s C} \frac{R(\omega)}{|G(j\omega)|^2} \quad (1)$$

expressed in terms of the components and substitution of starting values of the components and resolution of the values by an error minimization procedure where:

| | | |
|---|---|---|
| $T(j\omega)$ | = | transmission function for the filter in the resonant transfer mode, and has a value of unity for ideal transmission and a value of zero for no transmission. |
| $T_s$ | = | sampling interval. |
| C | = | Capacitance seen looking into the switched port of the filter, and |
| $R(\omega)$ | = | the real part of the impedance looking into the filter from the switched port as a function of frequency $\omega$. |
| $G(j\omega)$ | = | the impulse sequence impedance defined by Cattermole consisting of real part Re $G(j\omega)$ and an imaginary part Im $G(j\omega)$. |

Preferably, in communications systems filter 14 comprises a low-pass filter having a cut-off frequency less than one-half the sampling frequency.

The expression of formula 1, supra, in terms of the filter elements comprises briefly a determination of the impedance Z(s) of the filter configuration in the s domain as viewed from the switched port 36; determination of the impulse response $A(nT_s)$ from Z(s) at multiples of the sampling interval using Liou's method; determination of the impulse sequence impedance $G(j\omega)$ from the impulse response $A(nT_s)$; and determination of $R(\omega)$ from Z(s), where s is the complex frequency variable $j\omega$.

Figure 3:
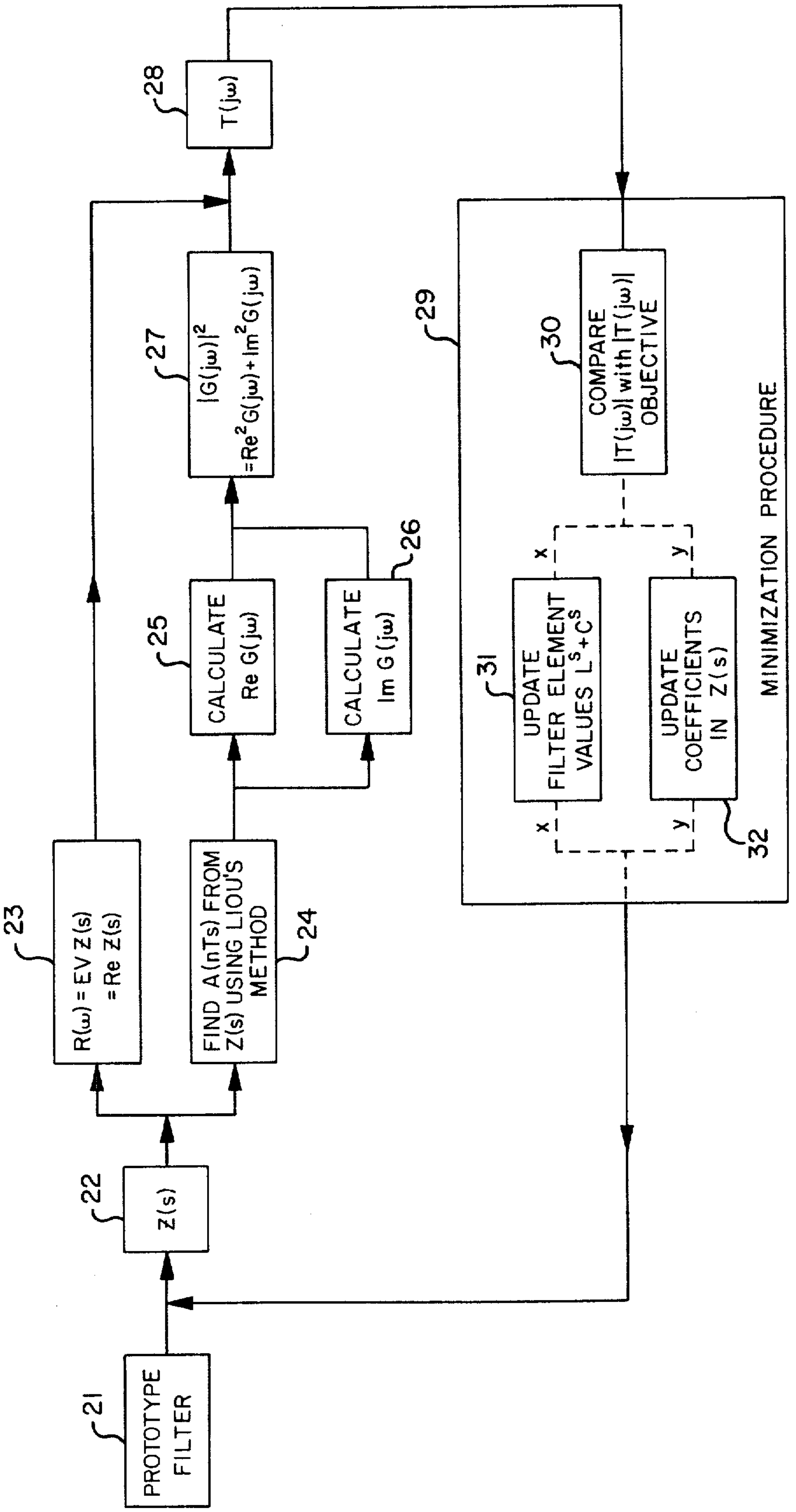
FIG. 3 is a block diagram illustrating the determination of the filter component values.

The foregoing steps as well as the error minimization procedure is illustrated in block diagram fashion in FIG. 3. The block at 21 represents the first step, designing a prototype filter to meet the attenuation requirements of the system: achieving nearly lossless transmission between filters over the passband when connected in a resonant transfer configuration and imposing much greater than 3 dB loss in the stopband, e.g., for a low-pass filter all frequencies one-half $F_s$ or greater. A signal attenuation in the order of 25 dB or greater will be necessary as above noted to eliminate aliasing or the frequency sideband overlap. The second step illustrated in block 22 is the obtaining for the chosen configuraton an equation Z(s) as above-identifed. This equation may be expressed as follows:

$$Z(s) = \frac{AI(6)S^5 + AI(5)S^4 + \ldots AI(2)S + AI(1)}{BI(7)S^6 + BI(6)S^5 + \ldots BI(2)S + BI(1)} \quad (2)$$

The coefficients in the numerator polynomial $AL_k$ and those in the denominator polynomial $BI_k$ will be in terms of the filter elements. The equation for $R(\omega)$, block 23, is determined from Z(s) by means of $$R(\omega) = EV\, Z(s) \Big|_{s=j\omega} = \frac{m_1 m_2 - n_1 n_2}{m_2^2 - n_2^2} \Big|_{s=j\omega} \quad (3)$$

where $m_1$ = even part of numerator of Z(s)
$m_2$ = even part of denominator of Z(s)
$n_1$ = odd part of numerator of Z(s)
$n_2$ = odd part of denominator of Z(s)
EV Z(s) = even part of Z(s)
$R(\omega)$ = real part of Z(s).

A discussion of the above is shown in "Introduction to Network Synthesis" by M. E. Van Valkenburg, Wiley 1960, p. 189.

Part of the denominator of the transmission function $|T(j\omega)|$ is the magnitude squared of the impulse sequence impedance $G(j\omega)$, see the work by Cattermole.

The impulse sequence impedance $G(j\omega)$ can be broken up into its real and imaginary parts as follows:

$$G(j\omega) = Re\, G(j\omega) + j Im\, G(j\omega) \quad (4)$$

which can in turn be written in the form:

$$G(j\omega) = \sum_{n=0}^{\infty} A(nT_s) \cos n\omega T_s + j \sum_{n=0}^{\infty} A(nT_s) \sin n\omega T_s \quad (5)$$

The coefficients $A(nT_s)$ are the impulse response at multiples of the sampling interval $T_s$. Therefore, the problem of expressing the transmission function in terms of the network element values is redefined in terms of expressing the coefficients $A(nT_s)$ in terms of the element values or expressing the coefficients in terms of Z(s) which is itself expressed in terms of the network element values as described above. This step is shown at block 24 in FIG. 3.

Previous methods of evaluating the impulse sequence impedance as required for the determination of the transmission function have not been promising as far as use in a filter synthesis program is concerned. The use of partial fractions and Z-transforms appears to be too cumbersome, and the use of numerical integration is to inaccurate for this application.

A method of determining filter impulse response by means of state variables has been presented by M. L.

Liou, "A Novel Method of Evaluating Transient Response," Proceedings Institute of Electronic and Electrical Engineers, 54:20–23, January 1966. The Liou method is exceptionally concise and accurate and is readily programmable for computer use. It has been discovered to be ideal for this application.

Following the presentation of Liou, consider a linear differential equation having $x^{coefficients}$.

$$x'''(t) + \alpha x''(t) + \beta x'(t) + \nu x(t) = 0 \quad (6)$$

with initial values $x(0)$, $x'(0)$, and $x''(0)$.

Taking the Laplace transform and solving for $X(s)$ results in $$X(s) = \frac{x(0)s^2 + [x'(0) + \alpha x(0)]s + [x''(0) + \alpha x'(0) + \beta x(0)]}{s^3 + \alpha s^2 + \beta s + \nu} \quad (7)$$

By comparison with the usual filter characteristic function $$Z(s) = \frac{AI_{m-1} S^{m-1} + \ldots + AI_2 S^2 + AI_1 S + AI_0}{S^m + BI_{m-1} S^{m-1} + \ldots + BI_1 S + BI_0} \quad (8)$$

which is the same e.g. as equation (2), supra, it can be seen that equation (8) has a differential equation corresponding to equation (6) of $$x^{(m)}(t) + BI_{m-1}x(\mathrm{m}-1)(t) + \ldots + BI_1 x'(t) = 0 \quad (9)$$

which has a Laplace tranform of $$S^m X(s) - S^{m-1} x(0) - S^{m-2} x'(0) - \ldots - x^{(m-1)}(0)$$
$$+ BI_{m-1} [S^{m-1} X(s) - S^{m-2} x(0) - S^{m-3} x'(0)$$
$$- \ldots - x^{(m-2)}(0)]$$
$$+ \ldots + BI_0 X(s) = 0 \quad (10)$$

so that in general $$Z(s) = \frac{AI_{m-1} S^{m-1} + \ldots + AI_2 S + AI_1 S + AI_0}{S^m + BI_{m-1} S^{m-1} + \ldots + BI_1 S + BI_0} \quad (11)$$

$$AI_{m-1} = x(0)$$
$$AI_{m-2} = x'(0) + BI_{m-1} x(0)$$
$$AI_{m-3} = x''(0) + BI_{m-1} x'(0) + BI_{m-2} x(0)$$

.

.

.

which can be solved for the initial conditions iteratively $$x(0) = AI_{m-1}$$
$$x'(0) = AI_{m-2} - BI_{m-1} x(0)$$
$$x''(0) = AI_{m-3} - BI_{m-1} x'(0) - BI_{m-2} x(0)$$

.

.

.

$$x^{(m-1)}(0) = AI_0 - BI_{m-1} x^{(m-2)}(0) - BI_{m-2} x^{(m-3)}(0) - \ldots - BI_1 x(0) \quad (12)$$

Equation (9) can be expressed in terms of state vectors as $$\vec{x}'(t) = \vec{A}\vec{x}(t) \quad (13)$$

where $$\vec{x}(t) = \begin{bmatrix} x(t) \\ x'(t) \\ \cdot \\ \cdot \\ x^{(m-1)}(t) \end{bmatrix} \quad (14)$$

and $$\vec{A} = \begin{bmatrix} 0 & 1 & 0 & \ldots & 0 & 0 \\ 0 & 0 & 1 & \ldots & 0 & 0 \\ 0 & 0 & 0 & \ldots & 0 & 0 \\ \cdot & & & & & \\ \cdot & & & & & \\ 0 & 0 & 0 & \ldots & 0 & 1 \\ -BI_0 & -BI_1 & -BI_2 & \ldots & -BI_{m-2} & -BI_{m-1} \end{bmatrix} \quad (15)$$

The solution of (13) as given by De Russo et al. "State Variables for Engineers," New York, J. Wiley, 1967, p. 356, is $$\vec{x}(t) = e^{\vec{A}(t-\tau)}\vec{x}(\tau) \quad (16)$$

where $$e^{\vec{A}T} = \phi(t) = \vec{1} + \frac{\vec{A}^2 t^2}{2!} + \frac{\vec{A}^3 t^3}{3!} + \ldots \quad (17)$$

is the state transition matrix.

Thus for $\tau + 0$ $$\vec{x}(t) = e^{\vec{A}t}\vec{x}(0) \quad (18)$$

and for $t = (n+1)t_1$ and $\tau = nt_1$ $$x[(n+1)t_1] = e^{\vec{A}t_1} x(nt_1). \quad (19)$$

Since $e^{\vec{A}t_1}$ in (19) is not a function of $t$, equation (19) can be used to calculate $x(nt_1)$ on a iterative basis. Equation (18) can then be used as required to check the results of the iterative calculation for accuracy. If the errors exceed the desired magnitude, the calculation can be re-initiated at an earlier point. Letting $t_1 = T_s$ results in $x(nT_s)$ given by Liou to be the same as the impulse values $A(nT_s)$ required for evaluation of $G(j\omega)$.

Blocks 25, 26 and 27 of FIG. 3 indicate the procedure for calculating the square of the magnitude of the impulse sequence impedance, $|G(j\omega)|^2$. Once the impulse response values $A(nT_s)$ are available, $G(j\omega)$ can be calculated using equation 5 above. Practically, the summation can be over a limited range of the $A(nT_s)$'s; 30 values of $A(nT_s)$ have been found to be satisfactory, values subsequent to 30 progressively decreasing in magnitude and becoming insignificant. Block 27 of the flow diagram that it is only necessary to square the real and the imaginary parts of the impulse sequence impedance to get the magnitude squared of the impulse sequence impedance as is commonly known.

At this point, both the numerator and the denominator of the transmission function $T(j\omega)$ have been determined, apart from the expression $2/T_sC$, in terms of the same function, namely Z(s). It will be recalled that Z(s) is written in terms of the network element values, and hence a transmission function is now expressed in terms of those same values. This is the equation to be used for the optimization or error minimization procedure.

Block 29 of the flow diagram of FIG. 3 represents the above-mentioned minimization procedure. The object of the calculation at this point is to calculate the transmission function of block 28 using the prototype filter element values, compare the transmission function thus calculated with the ideal transmission function which is the objective of the entire procedure (the transmission function equal to unity in the passband and equal to zero in the stopband), revising the prototype filter component values (or revising the coefficients in Z(s), as more fully explained below) and using these revised values to recalcuate Z(s) as shown in the flow diagram, and repeating the entire procedure until a desired degree of approximation of the recomputed transmission function of block 28 with the objective transmission function has been achieved. The minimization procedure of block 29 may be via a variety of mathematical techniques, a leastmean-square-error technique being preferred. See also Temes G. and D. Callahan, "Computer Aided Network Optimization — The State of the Art," Proceedings Institute of Electronic and Electrical Engineers, 55:1832–1863, November, 1967.

As mentioned above, it would have been possible to revise the coefficients in Z(s) (as shown at block 32 of FIG. 3) instead of expressing the coefficients in terms of the filter component values and subsequently revising the filter component values as shown at block 31. Theoretically, this technique would result in an optimization with a satisfactory error between the transmission function. Some starting values could have been assumed for the coefficients in Z(s) and the entire minimization procedure could have been followed with the substitution of the filter component values after the approximation had been achieved.

Although this is a possible approach, there is no guarantee that the final values of the coefficients in Z(s) will result in a realizable network when the filter component values are substituted for the coefficients. Whereas in the preferred procedure the network elements can be constrained to be positive, such a constraint on the coefficients in Z(s) will not guarantee that the filter component values will be positive when they are solved in terms of the minimized coefficients in Z(s). Additionally, the procedure of block 32 has been found to be more cumbersome, with the resultant possiblility for inaccuracy.

Figure 2:
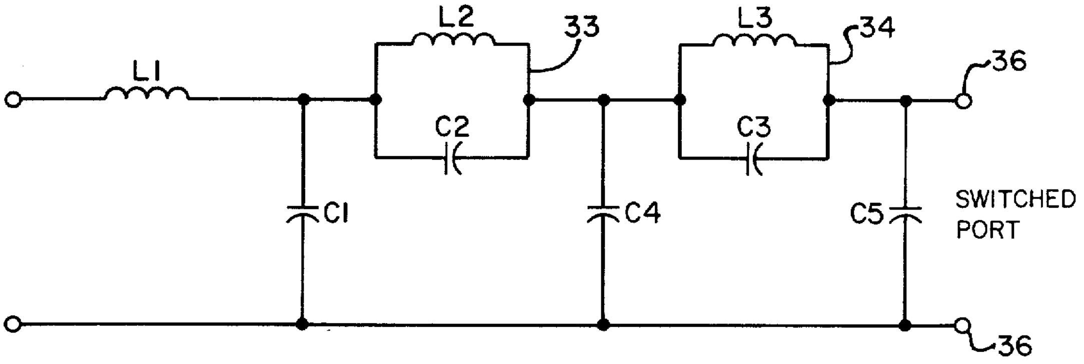
FIG. 2 is a circuit diagram of a resonant filter constructed in accordance with the present invention.

Illustrative of the design procedure, filter 14, FIG. 2, was designed to have a passband from 0 to 3.2 kHz when the sampling rate $F_s$ was 8 kHz so that ½ $F_s$ is equal to 4.0 kHz; 4.0 kHz marked the beginning of the stopband. Starting component values were:

$L_1 = 0.0332983$ H
$L_2 = 0.0601729$ H
$L_3 = 0.07741729$ H
$C_1 = 0.05505854$ F
$C_2 = 0.01544928$ F
$C_3 = 0.00718094$ F
$C_4 = 0.0698569$ F
$C_5 = 0.06561688$ F

The minimization objective was to obtain a transmission function magnitude of unity for normalized frequencies between 0 and 3.2 kHz and to have a transmission of $T = 0.01$ or 20 dB at 4 kHz and to have $T = 0$ for frequencies equal to or above 5 kHz. Using the design technique of the present invention and with the aid of a computer using a least-mean-square-error subroutine, the final filter was synthesized having final component values as follows:

$L_1 = 0.0386816$ H
$L_2 = 0.0606928$ H
$L_3 = 0.0761582$ H
$C_1 = 0.0561724$ F
$C_2 = 0.017928$ F
$C_3 = 0.00228147$ F
$C_4 = 0.0684817$ F
$C_5 = 0.0802652$ F

Figure 4:
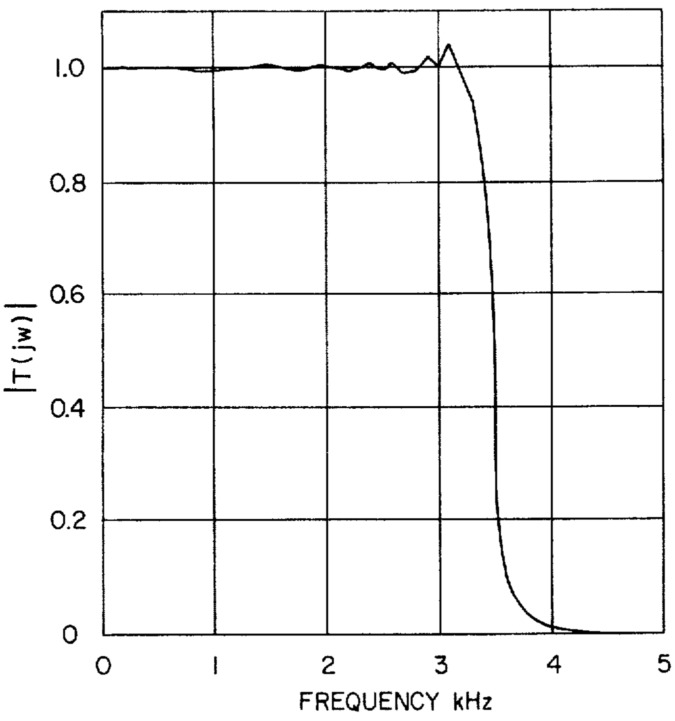
FIG. 4 is a graph of the transmission function of the filter of FIG. 2 showing the computed transmission function.

It should be noted that the list of starting component values and the list of final component values above have been normalized to an impedance of 1 ohm and a frequency of 1 kHz = 1. The computed function $|T(j\omega)|$ for the configuration of FIG. 2 using the final component values as obtained according to the present invention is shown in FIG. 4. Note that the curve holds very well to the minimization objective set forth above.

As a practical matter, capacitors are usually obtainable with an accuracy of about one percent and accordingly the final component values as determined above are used to calculate resonant frequencies for different parts of the circuit, and the components then tuned to such frequencies.

Two filters determined as above and connected in a resonant transfer circuit (FIG. 1) provided a measured insertion loss as shown in FIG. 5. It will be apparent from FIG. 5 that this filter, when constructed in accordance with the present invention, will operate in the resonant transfer mode with very little loss in the passband and with an attenuation of 25 dB at one-half of the sampling frequency, 4 kHz. It should be remembered that a better approximation to the desired characteristic can be obtained by starting with a more complex prototype filter. It is to be further noted that while the method of the present invention has been illustrated in connection with a low-pass filter, the method is entirely general and can be used as well in the design of a bandpass filter.

What is claimed is:

1. A lowpass filter suitable for use in a resonant transfer system, having a normally open gate, closed at a sampling frequency ($F_s$) for the transfer of energy, and comprising:

inductive and capacitive elements connected to approximate a transmission function, $T(j\omega)$, in the resonant transfer mode given by:

$$|T(j\omega)| = \left[\frac{2}{T_s C}\right] \left[\frac{R(\omega)}{|G(j\omega)|^2}\right]$$

where $T_s$ = sampling interval;
$C$ = capacitance seen looking into the switched port of the filter;
$R(\omega)$ = the real part of the impedance looking into the filter from the switched port as a function of frequency $\omega$;
$G(j\omega)$ = the impulse sequence impedance consisting of real part Re $G(j\omega)$ and an imaginary part Im $G(j\omega)$;
$\omega$ = the angular frequency for said filter;

such that, $T(j\omega) = 1$ for $\omega/2\pi < F_s/2$ $T(j\omega) < 1/2$ for $\omega/2\pi = F_s/2$ and $T(j\omega) = 0$ for $\omega/2\pi > F_s/2$. --.

2. A bandpass filter suitable for use in a resonant transfer system having a normally open gate, closed at a sampling frequency ($F_s$) for the transfer of energy, and comprising:

inductive and capacitive elements connected to approximate a transmission function, T(jω), in the resonant transfer mode given by:

$$|T(j\omega)| = \left[\frac{2}{T_s C}\right] \left[\frac{R(\omega)}{|G(j\omega)|^2}\right]$$

where, $T_s$ = sampling interval;
C = capacitance seen looking into the switched port of the filter
$R(\omega)$ = the real part of the impedance looking into the filter from the switched port as a function of frequency ω;
$G(j\omega)$ = the impulse sequence impedance consisting of real part Re G(jω) and an imaginary part Im G(jω);
ω = the angular frequency for said filter;

such that $T(j\omega) = 1$ for $(mF_s - (F_s/2)) < \omega/2\pi < (mF_s + (F_s/2))$, $T(j\omega) < 1/2$ for $\omega/2\pi = mF_s - (F_s/2)$, and $\omega/2\pi = mF_s + (F_s/2)$, and $T(j\omega) = 0$ for $\omega/2\pi < (mF_s - (F_s/2))$, and $\omega/2\pi > (mF_s + (F_s/2))$, $m$ = an integer. --.

3. A bandpass filter suitable for use in a resonant transfer system having a normally open gate, closed at a sampling frequency ($F_s$) for the transfer of energy, and comprising:

inductive and capacitive elements connected to approximate a transmission function, $T(j\omega)$, in the resonant transfer mode given by:

$$|T(j\omega)| = \left[\frac{2}{T_s C}\right] \left[\frac{R(\omega)}{|G(j\omega)|^2}\right]$$

where, $T_s$ = sampling interval;
C = capacitance seen looking into the switched port of the filter;
$R(\omega)$ = the real part of the impedance looking into the filter from the switched port as a function of frequency ω;
$G(j\omega)$ = the impulse sequence impedance consisting of real part Re G(jω) and an imaginary part Im G(jω);
ω = the angular frequency for said filter;

such that, $T(j\omega) = 1$ for $mF_s - (F_s/2) < \omega/2\pi < mF_s$ $T(j\omega) < 1/2$ for $\omega/2\pi = mF_s - (F_s/2)$, and $\omega/2\pi = mF_s$ $T(j\omega) = 0$ for $\omega/2\pi < mF_s - (F_s/2)$, and $\omega/2\pi > mF_s$ where $m$ = an integer. --.

4. A bandpass filter suitable for use in a resonant transfer system having a normally open gate, closed at a sampling frequency ($F_s$) for the transfer of energy, and comprising:

inductive and capacitive elements connected to approximate a transmission function, $T(j\omega)$, in the resonant transfer mode given by:

$$|T(j\omega)| = \left[\frac{2}{T_s C}\right] \left[\frac{R(\omega)}{|G(j\omega)|^2}\right]$$

where, $T_s$ = sampling interval;
C = capacitance seen looking into the switched port of the filter;
$R(\omega)$ = the real part of the impednace looking into the filter from the switched port as a function of frequency ω;
$G(j\omega)$ = the impulse sequence impedance consisting of real part Re G(jω) and an imaginary part Im G(jω);
ω = the angular frequency for said filter;

such that, $T(j\omega) = 1$ for $mF_s < \omega/2\pi < (mF_s + (F_s/2))$ $T(j\omega) < 1/2$ for $\omega/2\pi = mF_s$, and $\omega/2\pi = (mF_s + (F_s/2))$ $T(j\omega) = 0$ for $\omega/2\pi < mF_s$, and $\omega/2\pi > (mF_s + (F_s/2))$, where $m$ equals an integer.

* * * * *